US008524372B2

(12) United States Patent
Coulson

(10) Patent No.: US 8,524,372 B2
(45) Date of Patent: Sep. 3, 2013

(54) WATERPROOF PLASMA TREATED FOOTWEAR WITH LIQUID ABSORBING FOOTBED

(75) Inventor: Stephen Coulson, Abingdon (GB)

(73) Assignee: P2i Ltd., Abingdon, Oxfordshire (GB)

( * ) Notice: Subject to any disclaimer, the term of this patent is extended or adjusted under 35 U.S.C. 154(b) by 666 days.

(21) Appl. No.: 12/669,076

(22) PCT Filed: Jul. 16, 2008

(86) PCT No.: PCT/GB2008/002412
§ 371 (c)(1), (2), (4) Date: Mar. 29, 2010

(87) PCT Pub. No.: WO2009/010738
PCT Pub. Date: Jan. 22, 2009

(65) Prior Publication Data

US 2010/0192414 A1 Aug. 5, 2010

(30) Foreign Application Priority Data

Jul. 17, 2007 (GB) .................................. 0713830.8

(51) Int. Cl.
*B32B 9/04* (2006.01)
*B32B 27/00* (2006.01)
*B05D 1/02* (2006.01)
*A43B 13/22* (2006.01)
*B29D 35/00* (2010.01)

(52) U.S. Cl.
USPC ............ 428/500; 428/411.1; 427/447; 36/98; 12/142 R

(58) Field of Classification Search
None
See application file for complete search history.

(56) References Cited

U.S. PATENT DOCUMENTS

| | | | | |
|---|---|---|---|---|
| 5,433,994 | A * | 7/1995 | McKinney et al. | 442/221 |
| 5,622,773 | A | 4/1997 | Reiner et al. | |
| 6,329,024 | B1 | 12/2001 | Timmons et al. | |
| 6,482,531 | B1 | 11/2002 | Timmons et al. | |
| 7,051,459 | B1 | 5/2006 | Wigutow | |
| 8,163,356 | B2 * | 4/2012 | Coulson | 427/532 |
| 2004/0168346 | A1 * | 9/2004 | Boncutter et al. | 36/8.1 |
| 2005/0034330 | A1 | 2/2005 | Baychar | |

FOREIGN PATENT DOCUMENTS

| | | | |
|---|---|---|---|
| GB | 2341864 | A | 12/1998 |
| GB | 2358635 | A | 12/1999 |
| GB | 2365437 | A | 1/2000 |
| GB | 2354249 | A | 2/2000 |
| GB | 2427407 | A | 9/2005 |
| GB | 2434379 | A | 7/2007 |
| WO | WO-97/38801 | A1 | 10/1997 |
| WO | WO-98/58117 | A1 | 12/1998 |
| WO | WO-99/64662 | A1 | 12/1999 |
| WO | WO-00/05000 | A1 | 2/2000 |
| WO | WO-00/20130 | A1 | 4/2000 |
| WO | WO-02/28548 | A2 | 4/2002 |
| WO | WO-2005/063069 | A2 | 7/2005 |
| WO | WO-2005/063069 | A3 | 7/2005 |
| WO | WO-2005/089961 | A1 | 9/2005 |

OTHER PUBLICATIONS

Wang, J-H, et al., Plasma Synthesis of a Novel CF3-Dominated Fluorocarbon Film, Chem. Mater. 1996, 8 (9), pp. 2212-2214.

* cited by examiner

*Primary Examiner* — Sheeba Ahmed
(74) *Attorney, Agent, or Firm* — McCarter & English, LLP

(57) ABSTRACT

An item of footwear having a liquid-repelling polymeric coating, obtained by a plasma treatment process, provided over at least part of a surface thereof, said item also being provided at the region on the inside upon which the wearer's foot rests with a liquid-absorbing foot supporting footbed. Items of this type provide improved comfort for the wearer.

16 Claims, No Drawings

WATERPROOF PLASMA TREATED FOOTWEAR WITH LIQUID ABSORBING FOOTBED

RELATED APPLICATIONS

This application is a national stage application under 35 U.S.C. §371 of PCT/GB2008/002412, filed Jul. 16, 2008, which claims benefit of British application 0713830.8, filed Jul. 17, 2007.

The present invention relates to novel products in the form of items of footwear, in particular sports shoes or trainers, which are treated to reduce their overall permeability to liquid whilst retaining permeability to vapour, thereby allowing the sweat created in use by the wearer's foot to be transported by evaporation to the outside of the footwear, so reducing the physiological burden on the wearer and enhancing the comfort of the footwear to the wearer. The invention also provides methods for the production of such items of footwear.

Balancing the competing demands of rendering the outer surface of the footwear liquid-repellent, so as to prevent water or other liquids from entering into the footwear from the outside and increasing the overall weight of the footwear, whilst at the same time maintaining vapour permeability, such that sweat build-up between the wearer's foot and the inside of the footwear can be minimised by evaporation through the fabric of the footwear, presents particular challenges for manufacturers of footwear for active sports use, such as sports shoes or trainers. In use, such items of footwear become uncomfortable, even unpleasant, to wear due to excessive heat and sweat build-up next to the foot and the accompanying risk of unpleasant odours.

Hitherto, sports shoes manufacturers have attempted to overcome these problems by a variety of approaches. Commonly, for example, the upper portions of such shoes are manufactured from air permeable synthetic fabrics that permit high levels of air permeability (flow) and moisture vapour transport with a durable water repellent coating being applied to the fabric before construction to impart liquid resistance. However, although this may provide initial protection, this is rarely durable enough for prolonged use. Moreover, such a technique will be of no benefit in 'blocking' the many other possible entry points of water into the shoe.

Alternative approaches to preventing water from entering into such shoes which have been investigated have involved rendering the footwear 'water-proof' by incorporating an internal bootie of a film or membrane that prevents water from penetrating, such as a Gore-tex™ membrane. Generally, however, very few of the films or membranes used to achieve high levels of water-proofness offer any air permeability at all. As a consequence, sweat, which is produced mainly at the interface of the sole of the foot and the foot supporting base or footbed (often referred to as either in-sock or insole depending on its construction and function on which the foot rests) is prevented from evaporating effectively. Although some moisture vapour will be transported, either through tiny holes or by absorbing, diffusing and desorbing, the environment between the foot and the film or membrane is not substantially changed and this approach does not therefore afford significantly enhanced levels of comfort for the wearer.

Attention has also been paid to the design of the soles of the shoes in an attempt to improve the permeation of sweat through the sole of the shoe. Various modifications which it is proposed would allow permeation of sweat from the inside of the shoe to the outside through the sole but which would prevent external moisture from entering inside the shoe have been suggested, including providing perforated soles with waterproof membranes. In WO 2005/063069, a waterproof, breathable sole is described wherein at least an upper layer of the sole is provided with a water-proofing coating, obtained by a plasma deposition treatment, which acts as a physical barrier preventing ingress of water.

In spite of these developments, there remains a continuing need for improved methods of providing durable, vapour-permeable liquid-proofing treatments for footwear which provide adequate liquid-proofing protection, thereby reducing absorption through the footwear and keeping the overall weight down whilst at the same time ensuring that sweat created by the foot is rapidly transported through and out of the wearer's sock by evaporation to the outside of the footwear, so as to enhance the wearer's comfort.

Plasma deposition techniques have been quite widely used for the deposition of polymeric coatings onto a range of surfaces, and in particular onto fabric surfaces. This technique is recognised as being a clean, dry technique that generates little waste compared to conventional wet chemical methods. Using this method, plasmas are generated from organic molecules, which are subjected to an electrical field. When this is done in the presence of a substrate, the radicals of the compound in the plasma, polymerise onto the substrate. Conventional polymer synthesis tends to produce structures containing repeat units that bear a strong resemblance to the monomer species, whereas a polymer network generated using a plasma can be extremely complex. The properties of the resultant coating can depend upon the nature of the substrate as well as the nature of the monomer used and conditions under which it is deposited.

Although the use of plasma deposition processing techniques to enhance the water-repelling properties of materials is known, a disadvantage of exposing an entire shoe to such a process is that the entire surface is rendered liquid-repellent and there is therefore no absorbent region remaining which can act as a reservoir to accommodate sweat which has yet to evaporate. This can result in the inside of the shoe becoming unpleasantly moist when worn.

The present inventors have found that by incorporating a liquid-absorbing foot supporting footbed into an item of footwear which has been treated to deposit a liquid-repelling but vapour permeable polymeric coating on the surface thereof by a plasma polymerisation deposition process, sweat accumulating at the interface of the sole of the foot and the footbed on which the wearer's foot rests can be drawn away from the sole of the foot, through and out of the wearer's sock and can thence evaporate through the fabric of the footwear. This significantly enhances the comfort of the footwear for the wearer. Incorporating the footbed after the remainder of the footwear has been assembled also confers the advantage that access to the junctions between the sole and upper portions of the footwear is made easier, facilitating sealing of the seams of the footwear and helping to ensure that the treated item is water-repellent.

According to a first aspect, therefore, the present invention provides an item of footwear having a liquid-repelling polymeric coating, obtained by a plasma treatment process, provided over at least part of a surface thereof, said item also being provided at the region on the inside upon which the wearer's foot rests with a liquid-absorbing foot supporting footbed.

In a further aspect, the invention provides a method for preparing an item of footwear according to the first aspect comprising treating at least part of the surface of the item of footwear, or a material from which the item is constructed, to allow a liquid-repelling polymeric coating to be deposited thereon by a plasma treatment process, and providing a liquid-absorbing foot supporting insole at the region on the inside of the treated item upon which the wearer's foot rests.

The invention also provides a method of improving the comfort of an item of footwear to the wearer, said method comprising using an item prepared in accordance with the above method.

As discussed above, although it is important to protect the wearer from the threat outside the shoe, i.e. liquid ingress, it is paramount that heat and sweat building up inside the shoe can rapidly move away from the wearer and out of the shoe. The present invention provides an effective solution to the problem of balancing these competing requirements.

As used herein, the term "an item of footwear" refers to any footwear intended to be worn in situations where it is desirable to protect against entry of liquid from outside whilst allowing for sweat build-up between the wearer's foot and the inside of the footwear to be minimised by evaporation.

Suitably, this term includes footwear for use in sporting activities, such as running shoes and trainers.

A "liquid-absorbing foot supporting footbed" refers to a pad or bed provided on the inside sole of the footwear and upon which the wearer's foot rests when the item of footwear is worn. The footbed provides a cushioned surface and is water-absorbing such that it can absorb sweat produced by the wearer's feet. The footbed may be formed from any material conventionally known in the art such as polymeric materials (for example polyester or polypropylene) or natural materials (for example leather or cellulose) and will be shaped so as to fit inside the shoe and may be further modified to fit the wearers foot or walking or running style as best suits. It may also provide orthopedic benefits. Conveniently, the footbed will be removable to allow the ability to inter-change footbed inserts as appropriate. Removable inserts have the advantage of allowing any moisture absorbed by the footbed to more easily evaporate from the removed footbed when not in use. However fixed inserts are known which may suitably be glued in place using adhesive or may be stitched to the edge of the upper portion of the footwear according to known methods so as to form a pouch into which the wearer's foot can be inserted.

Preferably the liquid-absorbing foot supporting footbed does not have a liquid-repelling polymeric coating.

Any monomeric compound or gas which undergoes plasma polymerisation to form a water-repellent polymeric coating layer on the surface of the footwear may suitably be used. Suitable monomers which may be used include those known in the art to be capable of producing water-repellent polymeric coatings on substrates by plasma polymerisation including, for example, carbonaceous compounds having reactive functional groups, particularly substantially $-CF_3$ dominated perfluoro compounds (see WO 97/38801), perfluorinated alkenes (Wang et al., Chem Mater 1996, 2212-2214), hydrogen containing unsaturated compounds optionally containing halogen atoms or perhalogenated organic compounds of at least 10 carbon atoms (see WO 98/58117), organic compounds comprising two double bonds (WO 99/64662), saturated organic compounds having an optionally substituted alky chain of at least 5 carbon atoms optionally interposed with a heteroatom (WO 00/05000), optionally substituted alkynes (WO 00/20130), polyether substituted alkenes (U.S. Pat. No. 6,482,531B) and macrocycles containing at least one heteroatom (U.S. Pat. No. 6,329,024B), the contents of all of which are herein incorporated by reference.

Preferably, the item of footwear is provided with a polymeric coating formed by exposing the item to plasma comprising a compound of formula (I)

(I)

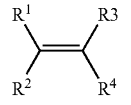

where $R^1$, $R^2$ and $R^3$ are independently selected from hydrogen, alkyl, haloalkyl or aryl optionally substituted by halo; and $R^4$ is a group $X—R^5$ where $R^5$ is an alkyl or haloalkyl group and X is a bond; a group of formula $—C(O)O—$, $—C(O)O(CH_2)_nY—$ where n is an integer of from 1 to 10 and Y is a bond or a sulphonamide group; or a group $—(O)_pR^6(O)_q(CH_2)_t—$ where $R^6$ is aryl optionally substituted by halo, p is 0 or 1, q is 0 or 1 and t is 0 or an integer of from 1 to 10, provided that where q is 1, t is other than 0, for a sufficient period of time to allow a protective polymeric layer to form on the surface of the item.

Suitable haloalkyl groups for $R^1$, $R^2$, $R^3$ and $R^5$ are fluoroalkyl groups. The alkyl chains may be straight or branched and may include cyclic moieties.

For $R^5$, the alkyl chains suitably comprise 2 or more carbon atoms, suitably from 2-20 carbon atoms and preferably from 6 to 12 carbon atoms.

For $R^1$, $R^2$ and $R^3$, alkyl chains are generally preferred to have from 1 to 6 carbon atoms.

Preferably $R^5$ is a haloalkyl, and more preferably a perhaloalkyl group, particularly a perfluoroalkyl group of formula $C_mF_{2m+1}$ where m is an integer of 1 or more, suitably from 1-20, and preferably from 4-12 such as 4, 6 or 8.

Suitable alkyl groups for $R^1$, $R^2$ and $R^3$ have from 1 to 6 carbon atoms.

In one embodiment, at least one of $R^1$, $R^2$ and $R^3$ is hydrogen. In a particular embodiment $R^1$, $R^2$, $R^3$ are all hydrogen. In yet a further embodiment however $R^3$ is an alkyl group such as methyl or propyl.

Where X is a group $—C(O)O—$ $—C(O)O(CH_2)_nY—$, n is an integer which provides a suitable spacer group. In particular, n is from 1 to 5, preferably about 2.

Suitable sulphonamide groups for Y include those of formula $—N(R^7)SO_2^-$ where $R^7$ is hydrogen or alkyl such as $C_{1-4}$alkyl, in particular methyl or ethyl.

In one embodiment, the compound of formula (I) is a compound of formula (II)

$$CH_2{=}CH—R^5 \quad (II)$$

where $R^5$ is as defined above in relation to formula (I).

In compounds of formula (II), X in formula (I) is a bond.

However in a preferred embodiment, the compound of formula (I) is an acrylate of formula (III)

$$CH_2{=}CR^7C(O)O(CH_2)_nR^5 \quad (III)$$

where n and $R^5$ as defined above in relation to formula (I) and $R^7$ is hydrogen, $C_{1-10}$ alkyl, or $C_{1-10}$haloalkyl. In particular $R^7$ is hydrogen or $C_{1-6}$alkyl such as methyl. A particular example of a compound of formula (III) is a compound of formula (IV)

(IV)

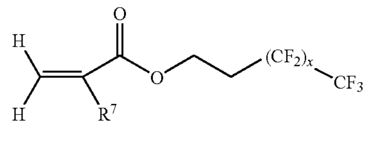

where $R^7$ is as defined above, and in particular is hydrogen and x is an integer of from 1 to 9, for instance from 4 to 9, and preferably 7. In that case, the compound of formula (IV) is 1H,1H,2H,2H-heptadecafluorodecylacylate.

Alternatively, a polymeric coating may be formed by exposing the item to plasma comprising one or more organic monomeric compounds, at least one of which comprises two carbon-carbon double bonds for a sufficient period of time to allow a polymeric layer to form on the surface.

Suitably the compound with more than one double bond comprises a compound of formula (V)

(V)

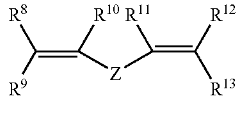

where $R^8$, $R^9$, $R^{10}$, $R^{11}$, $R^{12}$, and $R^{13}$ are all independently selected from hydrogen, halo, alkyl, haloalkyl or aryl optionally substituted by halo; and Z is a bridging group.

Examples of suitable bridging groups Z for use in the compound of formula (V) are those known in the polymer art. In particular they include optionally substituted alkyl groups which may be interposed with oxygen atoms. Suitable optional substituents for bridging groups Z include perhaloalkyl groups, in particular perfluoroalkyl groups.

In a particularly preferred embodiment, the bridging group Z includes one or more acyloxy or ester groups. In particular, the bridging group of formula Z is a group of sub-formula (VI)

(VI)

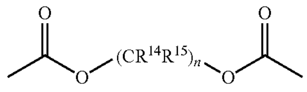

where n is an integer of from 1 to 10, suitably from 1 to 3, each $R^{14}$ and $R^{15}$ is independently selected from hydrogen, alkyl or haloalkyl.

Suitably $R^8$, $R^9$, $R^{10}$, $R^{11}$, $R^{12}$, and $R^{13}$ are haloalkyl such as fluoroalkyl, or hydrogen. In particular they are all hydrogen.

Suitably the compound of formula (V) contains at least one haloalkyl group, preferably a perhaloalkyl group.

Particular examples of compounds of formula (V) include the following:

A

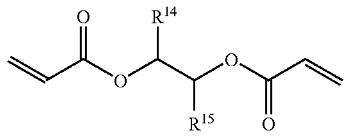

wherein $R^{14}$ and $R^{15}$ are as defined above, provided that at least one of $R^{14}$ or $R^{15}$ is other than hydrogen. A particular example of such a compound is a compound of formula B.

B

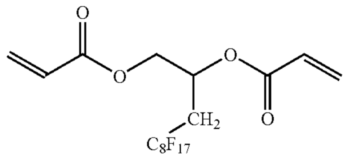

In a further aspect, the polymeric coating is formed by exposing the item to plasma comprising a monomeric saturated organic compound, said compound comprising an optionally substituted alkyl chain of at least 5 carbon atoms optionally interposed with a heteroatom for a sufficient period of time to allow a polymeric layer to form on the surface.

The term "saturated" as used herein means that the monomer does not contain multiple bonds (i.e. double or triple bonds) between two carbon atoms which are not part of an aromatic ring. The term "heteroatom" includes oxygen, sulphur, silicon or nitrogen atoms. Where the alkyl chain is interposed by a nitrogen atom, it will be substituted so as to form a secondary or tertiary amine. Similarly, silicons will be substituted appropriately, for example with two alkoxy groups.

Particularly suitable monomeric organic compounds are those of formula (VII)

(VII)

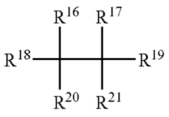

where $R^{16}$, $R^{17}$, $R^{18}$, $R^{19}$ and $R^{20}$ are independently selected from hydrogen, halogen, alkyl, haloalkyl or aryl optionally substituted by halo; and $R^{21}$ is a group X—$R^{22}$ where $R^{22}$ is an alkyl or haloalkyl group and X is a bond; a group of formula $—C(O)O(CH_2)_xY—$ where x is an integer of from 1 to 10 and Y is a bond or a sulphonamide group; or a group $—(O)_pR^{23}(O)_s(CH_2)_t—$ where $R^{23}$ is aryl optionally substituted by halo, p is 0 or 1, s is 0 or 1 and t is 0 or an integer of from 1 to 10, provided that where s is 1, t is other than 0.

Suitable haloalkyl groups for $R^{16}$, $R^{17}$, $R^{18}$, $R^{19}$, and $R^{20}$ are fluoroalkyl groups. The alkyl chains may be straight or branched and may include cyclic moieties and have, for example from 1 to 6 carbon atoms.

For $R^{22}$, the alkyl chains suitably comprise 1 or more carbon atoms, suitably from 1-20 carbon atoms and preferably from 6 to 12 carbon atoms.

Preferably $R^{22}$ is a haloalkyl, and more preferably a perhaloalkyl group, particularly a perfluoroalkyl group of formula $C_zF_{2z+1}$ where z is an integer of 1 or more, suitably from 1-20, and preferably from 6-12 such as 8 or 10.

Where X is a group $—C(O)O(CH_2)_yY—$, y is an integer which provides a suitable spacer group. In particular, y is from 1 to 5, preferably about 2.

Suitable sulphonamide groups for Y include those of formula $—N(R^{23})SO_2^-$ where $R^{23}$ is hydrogen, alkyl or haloalkyl such as $C_{1-4}$alkyl, in particular methyl or ethyl.

The monomeric compounds used in the method of the invention preferably comprises a $C_{6-25}$ alkane optionally substituted by halogen, in particular a perhaloalkane, and especially a perfluoroalkane.

In yet a further alternative, item is exposed to plasma comprising an optionally substituted alkyne for a sufficient period of time to allow a polymeric layer to form on the surface.

Suitably the alkyne compounds used in the method of the invention comprise chains of carbon atoms, including one or more carbon-carbon triple bonds. The chains may be optionally interposed with a heteroatom and may carry substituents including rings and other functional groups. Suitable chains, which may be straight or branched, have from 2 to 50 carbon atoms, more suitably from 6 to 18 carbon atoms. They may be present either in the monomer used as a starting material, or may be created in the monomer on application of the plasma, for example by the ring opening Particularly suitable monomeric organic compounds are those of formula (VIII)

$$R^{24}—C≡C—X^1—R^{25} \quad (VIII)$$

where $R^{24}$ is hydrogen, alkyl, cycloalkyl, haloalkyl or aryl optionally substituted by halo;

$X^1$ is a bond or a bridging group; and $R^{25}$ is an alkyl, cycloalkyl or aryl group optionally substituted by halogen.

Suitable bridging groups $X^1$ include groups of formulae $—(CH_2)_s—$, $—CO_2(CH_2)_p—$, $—(CH_2)_pO(CH_2)_q—$, $—(CH_2)_pN(R^{26})CH_2)_q—$, $—(CH_2)_pN(R^{26})SO_2—$, where s is 0 or an integer of from 1 to 20, p and q are independently selected from integers of from 1 to 20; and $R^{26}$ is hydrogen, alkyl, cycloalkyl or aryl. Particular alkyl groups for $R^{26}$ include $C_{1-6}$ alkyl, in particular, methyl or ethyl.

Where $R^{24}$ is alkyl or haloalkyl, it is generally preferred to have from 1 to 6 carbon atoms.

Suitable haloalkyl groups for $R^{24}$ include fluoroalkyl groups. The alkyl chains may be straight or branched and may include cyclic moieties. Preferably however $R^{24}$ is hydrogen.

Preferably $R^{25}$ is a haloalkyl, and more preferably a perhaloalkyl group, particularly a perfluoroalkyl group of formula $C_rF_{2r+1}$ where r is an integer of 1 or more, suitably from 1-20, and preferably from 6-12 such as 8 or 10.

In a preferred embodiment, the compound of formula (VIII) is a compound of formula (IX)

$$CH≡C(CH_2)_s—R^{27} \quad (IX)$$

where s is as defined above and $R^{27}$ is haloalkyl, in particular a perhaloalkyl such as a $C_{6-12}$ perfluoro group like $C_6F_{13}$.

In an alternative preferred embodiment, the compound of formula (VIII) is a compound of formula (X)

$$CH≡C(O)O(CH_2)_pR^{27} \quad (X)$$

where p is an integer of from 1 to 20, and $R^{27}$ is as defined above in relation to formula (IX) above, in particular, a group $C_8F_{17}$. Preferably in this case, p is an integer of from 1 to 6, most preferably about 2.

Other examples of compounds of formula (I) are compounds of formula (XI)

$$CH≡C(CH_2)_pO(CH_2)_qR^{27}, \quad (XI)$$

where p is as defined above, but in particular is 1, q is as defined above but in particular is 1, and $R^{27}$ is as defined in relation to formula (IX), in particular a group $C_6F_{13}$;

or compounds of formula (XII)

$$CH≡C(CH_2)_pN(R^{26})(CH_2)_qR^{27} \quad (XII)$$

where p is as defined above, but in particular is 1, q is as defined above but in particular is 1, $R^{26}$ is as defined above an in particular is hydrogen, and $R^{27}$ is as defined in relation to formula (IX), in particular a group $C_7F_{15}$;

or compounds of formula (XIII)

$$CH≡C(CH_2)_pN(R^{26})SO_2R^{27} \quad (XIII)$$

where p is as defined above, but in particular is 1, $R^{26}$ is as defined above an in particular is ethyl, and $R^{27}$ is as defined in relation to formula (IX), in particular a group $C_3F_{17}$.

In an alternative embodiment, the alkyne monomer used in the process is a compound of formula (XIV)

$$R^{28}C≡C(CH_2)_nSiR^{29}R^{30}R^{31} \quad (XIV)$$

where $R^{28}$ is hydrogen, alkyl, cycloalkyl, haloalkyl or aryl optionally substituted by halo, $R^{29}$, $R^{30}$ and $R^{31}$ are independently selected from alkyl or alkoxy, in particular $C_{1-6}$ alkyl or alkoxy.

Preferred groups $R^{28}$ are hydrogen or alkyl, in particular $C_{1-6}$ alkyl.

Preferred groups $R^{29}$, $R^{30}$ and $R^{31}$ are $C_{1-6}$ alkoxy in particular ethoxy.

Precise conditions under which the plasma polymerization takes place in an effective manner will vary depending upon factors such as the nature of the polymer, the item being treated and so on and will be determined using routine methods known in the art. Preferably, the plasma polymerisation treatment process according to the invention is a plasma deposition process.

Suitable plasmas for use in the method of the invention include non-equilibrium plasmas such as those generated by radiofrequencies (Rf), microwaves or direct current (DC). They may operate at atmospheric or sub-atmospheric pressures as are known in the art. In particular however, they are generated by radiofrequencies (Rf).

Various forms of equipment may be used to generate gaseous plasmas. Generally these comprise containers or plasma chambers in which plasmas may be generated. Particular examples of such equipment are described for instance in WO2005/089961 and WO02/28548, but many other conventional plasma generating apparatus are available.

In the method, in general, the substrate to be treated is placed within a plasma chamber together with one or more monomers, which are able to generate the target polymeric substance, in an essentially gaseous state, a glow discharge is ignited within the chamber and a suitable voltage, which may preferably be pulsed, is applied.

As used herein, the expression "in an essentially gaseous state" refers to gases or vapours, either alone or in mixture, as well as aerosols.

The gas present within the plasma chamber may comprise a vapour of the monomeric compound alone, but it may be combined with a carrier gas, in particular, an inert gas such as helium or argon. In particular helium is a preferred carrier gas, if a carrier is required, as this can minimise fragmentation of the monomer.

When used as a mixture, the relative amounts of the monomer vapour to carrier gas is suitably determined in accordance with procedures which are conventional in the art. The amount of monomer added will depend to some extent on the nature of the particular monomer being used, the nature of the substrate, the size of the plasma chamber and so forth. Generally, in the case of conventional chambers, monomer is delivered in an amount of from 50-1000 mg/min, for example at a rate of from 10-150 mg/min. It will be appreciated, however, that the rate will very much depends on the reactor size chosen and the number of substrates required to be processed at once; this in-turn depends on considerations such as the annual through-put required and the capital out-lay. Carrier gas such as helium is suitably administered at a constant rate for example at a rate of from 5-90, for example from 15-30 sccm. In some instances, the ratio of monomer to carrier gas will be in the range of from 100:0 to 1:100, for instance in the range of from 10:0 to 1:100, and in particular about 1:0 to 1:10. The precise ratio selected will be so as to ensure that the flow rate required by the process is achieved.

In some cases, a preliminary continuous power plasma may be struck for example for from 15 seconds-10 minutes within the chamber. This may act as a surface pre-treatment or activation step, ensuring that the monomer attaches itself readily to the surface, so that as polymerisation occurs, the deposition "grows" on the surface. The pre-treatment step may be conducted before monomer is introduced into the chamber, in the presence of only an inert gas.

The plasma is then suitably switched to a pulsed plasma to allow polymerisation to proceed, at least when the monomer is present.

In all cases, a glow discharge is suitably ignited by applying a high frequency voltage, for example at 13.56 MHz. This is applied using electrodes, which may be internal or external to the chamber, generally used for large and small chambers respectively.

Suitably the gas, vapour or gas mixture is supplied at a rate of at least 1 standard cubic centimeter per minute (sccm) and preferably in the range of from 1 to 100 sccm.

In the case of the monomer vapour, this is suitably supplied at a rate of from 80-1000 mg/minute whilst the continuous or pulsed voltage is applied. It may, however, be more appropriate for industrial scale use to have a fixed total monomer delivery that will vary with respect to the defined process time and will also depend upon the nature of the monomer and the technical effect required;

Gases or vapours may be drawn or pumped into the plasma region. In particular, where a plasma chamber is used, gases or vapours may be drawn into the chamber as a result of a reduction in the pressure within the chamber, caused by use of an evacuating pump. Alternatively, they may be pumped or injected into the chamber or delivered by any other known means for delivering a liquid or vapour to a vessel.

Polymerisation is suitably effected using vapours of compounds of formula (I), which are maintained at pressures of from 0.1 to 400 mtorr. It will be appreciated that the pressure chosen in any given case will depend on the type of shoe to be processed as the degree of solvents and or adhesives used will effect the out-gassing rate and hence the pressure at which the process occurs at.

The applied fields are suitably of power of from 5 to 500 W, suitably at about 10-200 W peak power, applied as a continuous or pulsed field. If pulses are required, they can be applied in a sequence which yields very low average powers, for example in a sequence in which the ratio of the time on:time off is in the range of from 1:500 to 1:1500. Particular examples of such sequence are sequences where power is on for 20-50 μs, for example about 30 μs, and off for from 1000 μs to 30000 μs, in particular about 20000 μs. Typical average powers obtained in this way are 0.01 W.

The total RF power required for the processing of a batch of shoes is suitably applied from 30 seconds to 90 minutes, preferably from 1 minute to 10 minutes, depending upon the nature of the compound of formula (I) and the type and number of items being enhanced in the batch.

Suitably a plasma chamber used is of sufficient volume to maximise the annual through-put and so the size and number of an individual chamber and the number of shoes that can be processed in a batch cycle will depend on numerous factors such as, but not limited to, (a) annual production volumes, (b) operating hours per day and annual operating days, (c) factory operating efficiency, (d) capital cost of equipment, (e) size of footwear and materials used.

The dimensions of the chamber will be selected so as to accommodate the particular footwear items being treated. For instance, generally cylindrical chambers may be suitable for a wide range of applications, but if necessary, elongate or rectangular chambers may be constructed or indeed cuboid, or of any other suitable shape.

The chamber may be a sealable container, to allow for batch processes, or it may comprise inlets and outlets for the items, to allow it to be utilised in a semi-continuous process. In particular in the latter case, the pressure conditions necessary for creating a plasma discharge within the chamber are maintained using high volume pumps, as is conventional for example in a device with a "whistling leak". However it will also be possible to process items of footwear at atmospheric pressure, or close to, negating the need for "whistling leaks"

The applied fields are suitably of power of from 20 to 500 W, suitably at about 100 W peak power, applied as a pulsed field. The pulses are applied in a sequence which yields very low average powers, for example in a sequence in which the ratio of the time on:time off is in the range of from 1:3 to 1:1500, depending upon the nature of the monomer gas employed. Although for monomers which may be difficult to polymerise, time on:time off ranges may be at the lower end of this range, for example from 1:3 to 1:5, many polmerisations can take place with a time on:time off range of 1:500 to 1:1500. Particular examples of such sequence are sequences where power is on for 20-50 μs, for example about 30 μs, and off for from 1000 μs to 30000 μs, in particular about 20000 μs. Typical average powers obtained in this way are 0.01 W.

The fields are suitably applied from 30 seconds to 90 minutes, preferably from 5 to 60 minutes, depending upon the nature of the monomer and the substrate, and the nature of the target coating required.

Suitable plasmas for use in the method of the invention include non-equilibrium plasmas such as those generated by radiofrequencies (Rf), microwaves or direct current (DC). They may operate at atmospheric or sub-atmospheric pressures as are known in the art. In particular however, they are generated by radiofrequencies (Rf).

Various forms of equipment may be used to generate gaseous plasmas. Generally these comprise containers or plasma chambers in which plasmas may be generated. Particular examples of such equipment are described for instance in WO2005/089961 and WO02/28548, but many other conventional plasma generating apparatus are available.

In all cases, a glow discharge is suitably ignited by applying a high frequency voltage, for example at 13.56 MHz. This is applied using electrodes, which may be internal or external to the chamber, but in the case of larger chambers are internal.

Suitably the gas, vapour or gas mixture is supplied at a rate of at least 1 standard cubic centimeter per minute (sccm) and preferably in the range of from 1 to 100 sccm.

In the case of the monomer vapour, this is suitably supplied at a rate of from 80-300 mg/minute, for example at about 120 mg per minute depending upon the nature of the monomer, whilst the pulsed voltage is applied.

Gases or vapours may be drawn or pumped into the plasma region. In particular, where a plasma chamber is used, gases or vapours may be drawn into the chamber as a result of a reduction in the pressure within the chamber, caused by use of an evacuating pump, or they may be pumped, sprayed, dripped, electrostatically ionised or injected into the chamber as is common in liquid handling.

Polymerisation is suitably effected using vapours of monomers which are maintained at pressures of from 0.1 to 400 mtorr, suitably at about 10-100 mtorr.

Precise conditions under which the plasma polymerization takes place in an effective manner will vary depending upon factors such as the nature of the polymer being deposited, as well as the nature of the substrate and will be determined using routine methods and/or other techniques.

The dimensions of the chamber will be selected so as to accommodate the particular substrate or device being treated. The chamber may be a sealable container, to allow for batch processes, or it may comprise inlets and outlets for the substrates, to allow it to be utilised in a continuous process as an in-line system. In particular in the latter case, the pressure conditions necessary for creating a plasma discharge within the chamber are maintained using high volume pumps, as is conventional for example in a device with a "whistling leak". However it will also be possible to process drug delivery systems at atmospheric pressure, or close to, negating the need for "whistling leaks".

The hydrophobicity of the treated shoe may be assessed using tests conventional in the art, such as the test method AATCC 193/2005 (American Association of Textile Colourists and Chemists).

The invention will now be particularly described by way of example.

EXAMPLE 1

A Victory branded shoe (with the footbed removed) from a footwear manufacturer was placed into a glass chamber tube of approximately 13 liters in volume with an externally wound copper coil electrode and evacuated for one minute using a Leybold screwline SP630 and a Leybold Roots blower 2001WSU pumpstack. After pumping for one minute, a continuous wave plasma was struck at 50 W for 30 seconds using a Dressler 'Cesar 1310' radio frequency generator and a home made matching network so as to activate the surface of the footwear. Following this a perfluorinated acrylate monomer was introduced into the chamber via a monomer tube under pulsed plasma conditions of 20 microseconds on-time, 20 milliseconds off time at a peak power of 50 W for a period of 5 minutes. After this time the RF supply was turned off, as was the monomer source and the system vented to air, following which the shoe was removed.

Initial assessment to determine the hydrophobicity of the shoe is carried out by placing droplets of water (or mixes of isopropyl alcohol) onto the shoe and assessing the degree of repellency by both run-off and wetting/wicking according to the test AATCC 193/2005 (American Association of Textile Colourists and Chemists). The shoe has a water rating of w6 according to this test method. The 'breathability' of the treated shoe compared to a corresponding untreated shoe can then be assessed by weighing the shoe before and after exposure to standard conditions simulating the human foot at a high stress level (34° C. and 5 ml/hr sweat rate) using the SATRA Advanced Moisture Management Test (SATRA TMV376).

The invention claimed is:

1. An item of footwear comprising a sole and an upper portion provided with a liquid-repelling and vapor-permeable polymeric coating, obtained by a plasma treatment process, wherein the coating covers the entire surface of the item of footwear, and wherein the item of footwear further is provided with a liquid-absorbing, foot-supporting footbed which does not have a liquid-repelling polymeric coating.

2. The item of claim 1 which is a sports shoe.

3. The item of claim 1, wherein the polymeric coating is formed by exposing the item to a pulsed plasma for a sufficient period of time to allow a protective polymeric layer to form on the surface of the item, and wherein the pulsed plasma comprises a compound of formula (I)

(I)

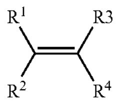

where $R^1$, $R^2$ and $R^3$ are independently selected from hydrogen, alkyl, haloalkyl or aryl optionally substituted by halo and $R^4$ is $X—R^5$ where $R^5$ is an alkyl or haloalkyl group and X is a bond; $—C(O)O—$; $—C(O)O(CH_2)_nY—$ where n is an integer from 1 to 10 and Y is a bond or a sulphonamide group; or $—(O)_pR^6(O)_q(CH_2)_t—$ where $R^6$ is aryl optionally substituted by halo, p is 0 or 1, q is 0 or 1 and t is 0 or an integer from 1 to 10, provided that where q is 1, t is other than 0.

4. The item of claim 3, wherein the item is exposed to pulsed plasma within a plasma deposition chamber.

5. The item of claim 4, wherein the compound of formula (I) is a compound of formula (II)

$$CH_2{=}CH—R^5 \qquad (II)$$

where $R^5$ is an alkyl or haloalkyl group and X is a bond; $—C(O)O—$;

$—C(O)O(CH_2)_nY—$ where n is an integer from 1 to 10 and Y is a bond or a sulphonamide group; or $—(O)_pR^6(O)_q(CH_2)_t—$ where $R^6$ is aryl optionally substituted by halo, p is 0 or 1, q is 0 or 1 and t is 0 or an integer of from 1 to 10, provided that where q is 1, t is other than 0; or the compound of formula (I) is a compound of formula (III)

$$CH_2{=}CR^7C(O)O(CH_2)_nR^5 \qquad (III)$$

wherein n is an integer from 1 to 10; $R^5$ is an alkyl or haloalkyl group and X is a bond; $—C(O)O—$; $—C(O)O(CH_2)_nY—$ where n is an integer from 1 to 10 and Y is a bond or a sulphonamide group; or $—(O)_pR^6(O)_q(CH_2)_t—$ where $R^6$ is aryl optionally substituted by halo, p is 0 or 1, q is 0 or 1 and t is 0 or an integer of from 1 to 10, provided that where q is 1, t is other than 0; and $R^7$ is hydrogen, $C_{1-10}$ alkyl, or $C_{1-10}$ haloalkyl.

6. The item of claim 5 wherein the compound of formula (III) is a compound of formula (IV)

(IV)

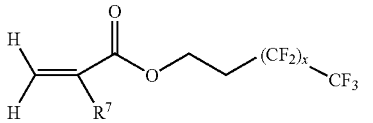

where $R^7$ is hydrogen, $C_{1-10}$ alkyl, or $C_{1-10}$haloalkyl and x is an integer from 1 to 9.

7. The item of claim 6 wherein the compound of formula (IV) is 1H,1H,2H,2H-heptadecafluorodecylacrylate.

8. The item of claim 1, wherein the polymeric coating is formed by exposing the item to plasma comprising a compound of formula (V)

(V)

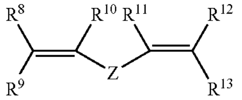

where $R^8$, $R^9$, $R^{10}$, $R^{11}$, $R^{12}$, and $R^{13}$ are independently selected from hydrogen, halo, alkyl, haloalkyl or aryl optionally substituted by halo; and Z is a bridging group.

9. The item of claim 1, wherein the polymeric coating is formed by exposing the item to plasma comprising a compound of formula (VII)

(VII)

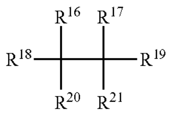

where $R^{16}$, $R^{17}$, $R^{18}$, $R^{19}$ and $R^{20}$ are independently selected from hydrogen, halogen, alkyl, haloalkyl or aryl optionally substituted by halo and $R^{21}$ is X—$R^{22}$ where $R^{22}$ is an alkyl or haloalkyl group and X is a bond; —C(O)O$(CH_2)_x$Y— where x is an integer from 1 to 10 and Y is a bond or a sulphonamide group; or —$(O)_pR^{23}(O)_s(CH_2)_t$— where $R^{23}$ is aryl optionally substituted by halo, p is 0 or 1, s is 0 or 1 and t is 0 or an integer from 1 to 10, provided that where s is 1, t is other than 0.

10. The item of claim 1, wherein the polymeric coating is formed by exposing the item to plasma comprising a compound of formula (VIII)

$$R^{24}—C{\equiv}C—X^1—R^{25} \quad \text{(VIII)}$$

where $R^{24}$ is hydrogen, alkyl, cycloalkyl, haloalkyl or aryl optionally substituted by halo; $X^1$ is a bond or a bridging group; and $R^{25}$ is an alkyl, cycloalkyl or aryl group optionally substituted by halogen.

11. The item of claim 1, wherein the liquid-absorbing foot supporting footbed is removable.

12. A method for preparing the item of footwear of claim 1 comprising treating the at least part of the surface of the item of footwear, or a material from which the item is constructed, to allow a liquid-repelling polymeric coating to be deposited thereon by a plasma deposition process, and providing a liquid-absorbing foot supporting footbed at a region on the inside of the treated item upon which a wearer's foot rests.

13. The method of claim 12, wherein the polymeric coating is formed by exposing at least part of the surface of the item to a pulsed plasma for a sufficient period of time to allow a protective polymeric layer to form on the surface of the item, and wherein the pulsed plasma comprises a compound of formula (I)

(I)

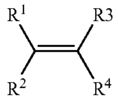

where $R^1$, $R^2$ and $R^3$ are independently selected from hydrogen, alkyl, haloalkyl or aryl optionally substituted by halo and $R^4$ is X—$R^5$ where $R^5$ is an alkyl or haloalkyl group and X is a bond; —C(O)O—, —C(O)O$(CH_2)_n$Y— where n is an integer from 1 to 10 and Y is a bond or a sulphonamide group; or —$(O)_pR^6(O)_q(CH_2)_t$— where $R^6$ is aryl optionally substituted by halo, p is 0 or 1, q is 0 or 1 and t is 0 or an integer from 1 to 10, provided that where q is 1, t is other than 0.

14. The method of claim 12, wherein the item to be treated is placed within a plasma chamber together with one or more monomers, which are able to generate the target polymeric substance, in an essentially gaseous state, a glow discharge is ignited within the chamber and a suitable pulsed voltage is applied.

15. The method of claim 12, wherein the pulsed voltage is applied in a sequence in which the ratio of time on to time off is in the range of from 1:500 to 1:1500.

16. A method of improving the comfort of an item of footwear comprising treating the item by the method of claim 12.

* * * * *

UNITED STATES PATENT AND TRADEMARK OFFICE

CERTIFICATE OF CORRECTION

PATENT NO. : 8,524,372 B2
APPLICATION NO. : 12/669076
DATED : September 3, 2013
INVENTOR(S) : Stephen Coulson It is certified that error appears in the above-identified patent and that said Letters Patent is hereby corrected as shown below:

In the Claims

Column 13, line 42, Claim 12, cancel the text beginning with "12. A method for preparing" to, and ending, with claim 16, inclusive, at column 14, line 42, and the text "12.", and insert the following claims:

--12. A method for preparing the item of footwear of claim 1 comprising depositing on the sole and the upper portion a liquid-repelling and vapor-permeable polymeric coating obtained by a plasma treatment process, wherein the coating covers the entire surface of the item of footwear, and providing a liquid-absorbing foot-supporting footbed, which does not have a liquid-repelling polymeric coating, at a region on the inside of the coated item upon which a wearer's foot rests.

13. The method of claim 12, wherein the polymeric coating is formed by exposing the item to a pulsed plasma for a sufficient period of time to allow a protective polymeric layer to form on the surface of the item, and wherein the pulsed plasma comprises a compound of formula (I)

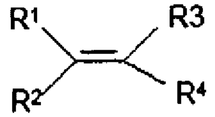

(I)

where $R^1$, $R^2$ and $R^3$ are independently selected from hydrogen, alkyl, haloalkyl or aryl optionally substituted by halo and $R^4$ is $X-R^5$ where $R^5$ is an alkyl or haloalkyl group and X is a bond; $-C(O)O-$, $-C(O)O(CH_2)_nY-$ where n is an integer from 1 to 10 and Y is a bond or a sulphonamide group; or $-(O)_pR^6(O)_q(CH_2)_t-$ where $R^6$ is aryl optionally substituted by halo, p is 0 or 1, q is 0 or 1 and t is 0 or an integer from 1 to 10, provided that where q is 1, t is other than 0.

14. The method of claim 12, wherein the depositing comprises placing the item within a plasma chamber together with one or more monomers in an essentially gaseous state, which are able to generate the polymeric coating, igniting a glow discharge within the chamber, and applying a suitable pulsed voltage for a time sufficient to obtain the deposited liquid-repelling and vapor-permeable polymeric coating.

15. The method of claim 14, wherein the pulsed voltage is applied in a sequence in which the ratio of time on to time off is 1.500 to 1:1500.--

Signed and Sealed this
Sixth Day of May, 2014

Michelle K. Lee
*Deputy Director of the United States Patent and Trademark Office*

UNITED STATES PATENT AND TRADEMARK OFFICE

CERTIFICATE OF CORRECTION

PATENT NO. : 8,524,372 B2
APPLICATION NO. : 12/669076
DATED : September 3, 2013
INVENTOR(S) : Stephen Coulson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 737 days.

Signed and Sealed this
Fifteenth Day of September, 2015

Michelle K. Lee
*Director of the United States Patent and Trademark Office*

UNITED STATES PATENT AND TRADEMARK OFFICE

CERTIFICATE OF CORRECTION

PATENT NO. : 8,524,372 B2
APPLICATION NO. : 12/669076
DATED : September 3, 2013
INVENTOR(S) : Stephen Coulson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 737 days.

Signed and Sealed this
Twenty-second Day of December, 2015

Michelle K. Lee
*Director of the United States Patent and Trademark Office*